June 4, 1935.  I. HECHENBLEIKNER  2,004,000
PROCESS AND APPARATUS FOR MANUFACTURE OF NITRIC ACID
Filed May 8, 1928
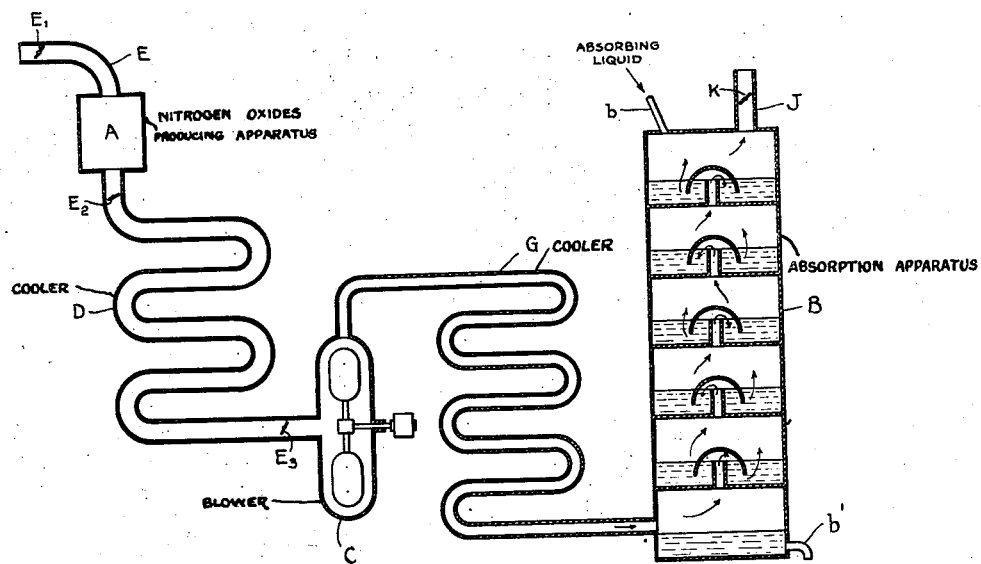
INVENTOR
Ingenuin Hechenbleikner
BY
ATTORNEYS Patented June 4, 1935

2,004,000

UNITED STATES PATENT OFFICE 2,004,000

PROCESS AND APPARATUS FOR MANUFACTURE OF NITRIC ACID

Ingenuin Hechenbleikner, Charlotte, N. C., assignor, by mesne assignments, to Chemical Construction Corporation, a corporation of Delaware Application May 8, 1928, Serial No. 276,031

18 Claims. (Cl. 23—162)

This invention relates to the manufacture of nitric acid and relates more particularly to the manufacture of nitric acid by the ammonia oxidation process, that is, by the oxidation of ammonia to oxides of nitrogen and the subsequent absorption of said oxides of nitrogen in water or dilute nitric acid, concurrently with the further oxidation of the lower oxides of nitrogen to the higher oxides of nitrogen, to form nitric acid.

It is well known that a mixture of ammonia gas and air, when passed through a catalytic agent such, for example, as a heated platinum gauze, reacts with generation of heat to form oxides of nitrogen of a degree of oxidation not less than that expressed by the chemical formula NO. The apparatus in which this reaction takes place is commonly called a converter; and the quantity of nitrogen oxides obtained from a given quantity of ammonia is a measure of the efficiency of conversion. It is known that the efficiency of conversion can be materially increased by operating said converter under a partial vacuum, that is, by drawing the mixture of ammonia gas and air through the converter under less than atmospheric pressure. It is also well known that this efficiency of conversion is materially reduced if said converter is operated under pressure, that is, by forcing or "pushing" the mixture of ammonia gas and air through the converter under more than atmospheric pressure.

In the manufacture of the nitric acid, these oxides of nitrogen are first cooled by any suitable means down to a limit where any water vapor should be condensed, but not necessarily lower than the ordinary atmospheric temperature, and then absorbed by being passed, together with excess oxygen (which may be the residual oxygen from the original mixture of ammonia gas and air or oxygen secured by the admission of additional air into the gas stream carrying the oxides of nitrogen), through a tower or a series of towers partially filled with an acid resisting packing down which a liquid, such as a stream of water or dilute nitric acid, is circulated, the oxides of nitrogen being absorbed by the liquid to form dilute nitric acid. In order to secure practically complete absorption and conversion of the oxides of nitrogen into nitric acid, a series of such towers, through which the gas passes successively, is necessary. As these towers are of relatively large volume and must be built of acid resisting material, the construction cost is considerable and is a major portion of the entire cost of a plant for producing nitric acid. Furthermore, the strength of the acid produced by such towers is only from 50 to 60% $HNO_3$, and usually nearer the lower limit of this range. Nitric acid of this strength is too dilute for many requirements of the arts and it is necessary for such purposes to concentrate it by subsequent operations to a higher strength. The cost of such subsequent concentration is greater the weaker the strength of the acid produced by the towers.

It is known that if these absorption towers are operated under pressure, that is, if the oxides of nitrogen and excess oxygen are forced through the towers under pressure appreciably greater than atmospheric pressure and preferably several times greater than atmospheric pressure, the efficiency of absorption is materially increased, towers of materially smaller total volume are required, and the strength of the acid produced by the towers is materially increased. The decrease in required tower volume materially decreases the cost of the plant and the increase in the strength of the acid produced by the towers materially increases its commercial value by decreasing the cost of any required subsequent concentration.

It is now common practice, however, to operate the entire system of converter and absorption towers under a slight vacuum, usually produced by a suction fan or other type of exhauster located at the exit of the gases from the last tower of the series of absorption towers. It will be seen, however, that while this practice permits the securing of a high efficiency of conversion in the converter, it requires, as explained above, a large expensive series of towers and results in the formation of only a dilute nitric acid.

It has been proposed to operate the entire system of converter and absorption towers under pressure, usually produced by a blower or compressor located in the line supplying air to the ammonia-air mixture entering the converter. In order to have sufficient pressure on the gases in the absorption towers to gain the benefits previously described as resulting from operating the towers under pressure, viz.—greater efficiency of absorption, reduced total tower volume and increased strength of acid,—it is necessary, according to this proposed system, to maintain an excessive pressure on the converter, resulting in a material decrease of efficiency of conversion.

The prime object of my present invention is directed to the provision of an improved converter and absorption system for the manufacture of nitric acid in which all of the foregoing disadvantages are eliminated and the foregoing advantages combined; the invention centering more specifically about the provision of a system in which the converter is maintained under a partial vacuum and the absorption towers under a pressure appreciably greater than atmospheric pressure and preferably several times greater than atmospheric pressure.

To the accomplishment of the foregoing and such other objects as will hereinafter appear, my invention consists in the elements and their relation one to the other, as hereinafter more particularly described and sought to be defined in the claims; reference being had to the accompanying drawing which shows the preferred embodiment of my invention, and in which:

The figure is a diagrammatic side elevational view of the apparatus of my present invention.

Referring now more in detail to the drawing, the plant employed in the manufacture of nitric acid, in accordance with my present invention, comprises an apparatus A in which oxides of nitrogen are produced under a partial vacuum; an apparatus generally designated as B for absorbing said oxides of nitrogen at a pressure appreciably greater than atmospheric pressure to produce the nitric acid; and means for producing a partial vacuum in the apparatus A and for delivering said oxides of nitrogen under pressure to the absorbing apparatus B, said means comprising a blower or compressor C interposed between the nitrogen oxide producing apparatus A and said absorption apparatus B, and said blower operating for withdrawing the nitrogen oxides from the apparatus A and for producing a partial vacuum therein and also for delivering said nitrogen oxides to said absorption apparatus B under the desired pressure appreciably greater than atmospheric.

The apparatus A comprises a converter in which the nitrogen oxides are produced in the presence of a catalyst and to which ammonia gas and air are carried or fed through a pipe E. In the converter A the nitrogen oxides are generated at an elevated temperature; and before passing into the blower or compressor C, the oxides of nitrogen and residual gases are passed through a cooler D where the temperature of the gases is reduced sufficiently to permit the introduction of the gases into the blower C without damage to the material out of which said blower is constructed. The blower C furnishes the suction for drawing the gases through the pipe E, converter A and cooler D, at a reduced pressure and thus the conversion in the converter A takes place under a partial vacuum, the extent of which may be regulated and controlled by a damper inserted either in the pipe E at the point $E_1$ or at the entrance to the cooler D at the point $E_2$, or elsewhere in the pipe lines in front of the blower C, as may be found most convenient.

The blower or compressor C also functions for compressing the gases to a pressure appreciably greater than atmospheric pressure, and preferably several times greater than atmospheric pressure, and incidentally this action results in increasing the temperature of the gases. The gases are then preferably cooled by passage through a cooler G down to a limit where any water vapor should be condensed, but not necessarily lower than ordinary atmospheric temperature; and the gases are then passed through the absorption tower or system B.

The absorption tower B comprises a vessel having a plurality of sections through which the gases flow in the manner indicated by the arrows, said gases being forced through an absorption liquid entering at the top at $b$ and overflowing from section to section and having exit at the bottom through a duct $b'$. The absorption liquid may, for example, be either water or dilute nitric acid. The residual gases leave the absorption tower through the stack J containing a damper K by means of which the pressure developed in the gases by the blower C is maintained to the desired degree, the damper controlling the pressure of the gases in the absorption tower B.

By locating the blower C intermediate the converter A and the absorption tower B and operating the plant or system as described, I am enabled to produce an increased efficiency in the generation of the nitrogen oxides by reason of said generation taking place under a slight vacuum, and I am enabled to effect an increased efficiency in the absorption of the nitrogen oxides and to produce a greater strength of the acid or other solution in the absorption step as well as a decrease in the required total tower volume by reason of said absorption taking place under a pressure appreciably greater than atmospheric pressure.

While I have disclosed a single absorption vessel B, it is obvious that my invention is not confined to any specific design, number, and/or arrangement of absorption vessels, such design, number and/or arrangement being determined by the quantity of gas to be handled and by other factors. While I have not shown the kind of apparatus used for circulating the absorbing liquid through the towers, it will be understood that any of the present and well known apparatus for such circulation suitable for use with my invention may be employed. Although I have referred to water and/or dilute nitric acid as being the absorbing liquids circulated through the towers, it will be apparent that my invention is equally applicable when any other liquid is circulated through the towers, provided such liquid has the property of absorbing oxides of nitrogen to form nitric acid or derivatives or compounds thereof more efficiently when said oxides of nitrogen are at a pressure appreciably greater than atmospheric pressure than when they are at atmospheric pressure or under slight vacuum.

As disclosed I have shown three stages wherein the oxides of nitrogen are cooled, viz.—at D before entering the first stage of the blower or compressor C, between the first and second stages of the blower or compressor C, and at G before entering the absorption system. It will be understood that other cooling arrangements may be provided, the three stage cooling disclosed being preferred. Such cooling is required only to the extent necessary to protect the materials out of which the various pieces of apparatus are constructed and to the extent necessary to reduce the temperature of the gases entering the absorption towers to a temperature at which efficient absorption will take place.

While I have referred to oxides of nitrogen produced by the passage of a mixture of ammonia gas and air through a converter, it will be appreciated that my invention is equally applicable for use with oxides of nitrogen, of a degree of oxidation not less than that represented by the chemical formula NO, produced in any other manner provided such manner of production is of a kind that is improved by being performed under a slight vacuum.

Preferably I employ a single stage blower or compressor C; but it is obvious that my invention is not confined to the use of a single stage blower or compressor and that the essential feature of my invention, viz.—the operation of the converter under a partial vacuum and of the absorption tower under a pressure appreciably greater than atmospheric pressure, may equally well be obtained by the use of a multiple stage compressor or by the use of two or more single or multiple stage compressors connected so that the gases pass through them successively.

It will be apparent that while I have shown and described my invention in the preferred form, many changes and modifications may be made in the structure disclosed without departing from the spirit of the invention, defined in the following claims.

What I claim is:

1. The process of manufacturing nitric acid which consists in producing oxides of nitrogen under a partial vacuum, in then cooling, compressing and re-cooling the oxides of nitrogen and in absorbing said oxides of nitrogen at a pressure appreciably greater than atmospheric pressure in an absorbing liquid to produce the nitric acid.

2. The process of manufacturing nitric acid and/or derivatives thereof which consists in oxidizing ammonia under a partial vacuum in the presence of a catalyst to produce oxides of nitrogen, in then cooling the oxides of nitrogen, in then compressing the oxides of nitrogen, and in absorbing said oxides of nitrogen at a pressure several times greater than atmospheric pressure in an absorbing liquid to produce the nitric acid and/or derivatives thereof.

3. The process of manufacturing nitric acid which consists in producing oxides of nitrogen in one stage of the process, in withdrawing from such stage the oxides of nitrogen whereby the oxides of nitrogen are produced under a partial vacuum, in then absorbing the oxides of nitrogen in another stage of the process in an absorbing liquid to produce the nitric acid, and in forcing the oxides of nitrogen into the second stage whereby the absorption of the oxides of nitrogen is carried on under a pressure appreciably greater than atmospheric pressure.

4. The process of manufacturing nitric acid which consists in oxidizing ammonia in the presence of a catalyst in one stage of the process to produce oxides of nitrogen, in withdrawing from such stage the oxides of nitrogen whereby the oxides of nitrogen are produced under a partial vacuum, in then absorbing the oxides of nitrogen in another stage of the process in an absorbing liquid to produce the nitric acid, and in forcing the oxides of nitrogen into the second stage whereby the absorption of the oxides of nitrogen is carried on under a pressure several times greater than atmospheric pressure.

5. The process of manufacturing nitric acid which consists in producing oxides of nitrogen in one stage of the process, in then flowing the oxides of nitrogen through a compressor, and in thereafter absorbing the oxides of nitrogen in another stage of the process to produce the nitric acid, the said compressor acting to withdraw the oxides of nitrogen from the first stage and to deliver the same under pressure to the second stage of the process.

6. The process of manufacturing nitric acid which consists in producing oxides of nitrogen in one stage of the process, in then cooling the oxides of nitrogen, in then flowing the cooled oxides of nitrogen through a compressor, and in thereafter absorbing the oxides of nitrogen in another stage of the process to produce the nitric acid, the said compressor acting to withdraw the oxides of nitrogen from the first stage and to deliver the same under a pressure appreciably greater than atmospheric pressure to the second stage of the process.

7. The process of manufacturing nitric acid which consists in oxidizing ammonia in the presence of a catalyst to generate oxides of nitrogen in one stage of the process, in then cooling the oxides of nitrogen, in then flowing the cooled oxides of nitrogen through a compressor, in then again cooling the oxides of nitrogen while maintaining the same under pressure produced by the compressor, and in thereafter absorbing the oxides of nitrogen in another stage of the process to produce the nitric acid, the said compressor acting to withdraw the oxides of nitrogen from the first stage and to deliver the same under a pressure appreciably greater than atmospheric pressure to the second stage of the process.

8. The process of manufacturing nitric acid which comprises producing oxides of nitrogen by oxidizing ammonia at a pressure not substantially above atmospheric, then absorbing said oxides in an absorbing liquid at a pressure substantially greater than atmospheric.

9. The process of manufacturing nitric acid which comprises producing oxides of nitrogen by oxidizing ammonia at a pressure not substantially above atmospheric, compressing the resulting gases to substantially above atmospheric pressure, cooling the compressed nitrogen oxides and absorbing the compressed nitrogen oxides with water.

10. The process of manufacturing nitric acid which comprises producing oxides of nitrogen by oxidizing ammonia at a pressure not substantially above atmospheric, cooling, compressing and re-cooling the oxides of nitrogen, and absorbing said oxides of nitrogen in an absorbing liquid at a pressure substantially greater than atmospheric.

11. The process of manufacturing nitric acid which comprises producing oxides of nitrogen by oxidizing ammonia at a pressure not substantially above atmospheric, then cooling the oxides of nitrogen, then compressing said oxides of nitrogen and then absorbing said oxides of nitrogen in an absorbing liquid at a pressure substantially greater than atmospheric.

12. A nitric acid plant comprising an apparatus for producing oxides of nitrogen, an apparatus for absorbing said oxides of nitrogen and a blower apparatus interposed between said nitrogen oxide producing apparatus and said absorption apparatus and operating for withdrawing the nitrogen oxides from the first apparatus and producing a partial vacuum therein and for delivering said nitrogen oxides to said second apparatus under pressure and producing a pressure greater than atmospheric therein.

13. A nitric acid plant comprising a catalytic apparatus for producing oxides of nitrogen from ammonia and oxygen, an apparatus for absorbing said oxides of nitrogen, and a blower apparatus interposed between said nitrogen oxide producing apparatus and said absorption apparatus and operating for withdrawing the nitrogen oxides from the first apparatus and producing a partial vacuum therein and for delivering said nitrogen oxides to said second apparatus under pressure and producing a pressure greater than atmospheric therein.

14. A nitric acid plant comprising an apparatus for producing oxides of nitrogen under a partial vacuum, of a degree of oxidation not lower than NO, a blower or compressor for both producing said partial vacuum and then delivering said oxides of nitrogen at a pressure appreciably greater than atmospheric pressure, an absorption tower receiving said oxides of nitrogen from said blower and in which said oxides of nitrogen are absorbed at a pressure appreciably greater than atmospheric pressure, and means for regulating the degrees of vacuum and pressure occurring in said apparatus and tower.

15. A nitric acid plant comprising an apparatus for producing oxides of nitrogen, of a degree of oxidation not lower than NO, and under a partial vacuum, a blower or compressor for both producing said partial vacuum and then delivering said oxides of nitrogen at a pressure appreciably greater than atmospheric pressure, means arranged in advance of said compressor for cooling said oxides of nitrogen, an absorption tower receiving said oxides of nitrogen from said blower and in which said oxides of nitrogen are absorbed at a pressure appreciably greater than atmospheric pressure in an absorbing liquid of a chemical composition such as to form nitric acid, and means for regulating the degrees of vacuum and pressure occurring in the various parts of the plant.

16. A nitric acid plant comprising a catalytic apparatus for producing oxides of nitrogen from ammonia and oxygen, of a degree of oxidation not lower than NO, and under a partial vacuum, a blower or compressor for both producing said partial vacuum and then delivering said oxides of nitrogen at a pressure several times greater than atmospheric pressure, means for cooling said oxides of nitrogen, an absorption tower receiving said oxides of nitrogen from said blower and in which said oxides of nitrogen are absorbed at a pressure several times greater than atmospheric pressure in an absorbing liquid of a chemical composition such as to form nitric acid, and means for regulating the degrees of vacuum and pressure occurring in the various parts of the plant.

17. A nitric acid plant comprising an apparatus for producing oxides of nitrogen, an apparatus for absorbing said oxides of nitrogen, and a compressor apparatus interposed between said nitrogen oxide producing apparatus and said absorption apparatus and operating for withdrawing the nitrogen oxides from the first apparatus, for compressing the oxides of nitrogen, and for delivering said nitrogen oxides to said second apparatus under pressure.

18. A nitric acid plant comprising an apparatus for producing oxides of nitrogen, an apparatus for absorbing said oxides of nitrogen, a compressor apparatus interposed between said nitrogen oxide producing apparatus and said absorption apparatus and operating for withdrawing the nitrogen oxides from the first apparatus, for compressing the oxides of nitrogen, and for delivering said nitrogen oxides to said second apparatus under pressure, and a cooling apparatus interposed between said compressor apparatus and the apparatus for producing the oxides of nitrogen.

INGENUIN HECHENBLEIKNER.